United States Patent
McJunkin, Jr.

[11] 3,711,079
[45] Jan. 16, 1973

[54] STABILIZING MEANS FOR SPRING-MOUNTED CHASSIS OF WHEELED VEHICLES

[75] Inventor: Howard P. McJunkin, Jr., Lexington, Ky. 40502

[73] Assignee: Hurst Performance Inc., Warminster, Pa.

[22] Filed: Dec. 10, 1970

[21] Appl. No.: 96,694

[52] U.S. Cl. .............................267/11 R, 280/124 R
[51] Int. Cl. ..............................................B60g 21/00
[58] Field of Search.280/124 B, 124 R; 267/25, 11 R

[56] References Cited
FOREIGN PATENTS OR APPLICATIONS
694,386   7/1953   Great Britain.....................267/11 R Primary Examiner—Albert J. Makay
Assistant Examiner—Jerold M. Forsberg
Attorney—William E. Sherwood

[57] ABSTRACT

A wheeled vehicle having a live axle suspended on a pair of leaf springs attached to the chassis employs a unitary stabilizing bar supported by both springs and in isolated mounting relation to the chassis frame and to the axle housing.

4 Claims, 4 Drawing Figures

PATENTED JAN 16 1973

3,711,079

INVENTOR
HOWARD P. McJUNKIN JR.

BY  U. E. Sherwood
ATTORNEY

STABILIZING MEANS FOR SPRING-MOUNTED CHASSIS OF WHEELED VEHICLES

BACKGROUND OF THE INVENTION

Conventional live axle spring suspensions on motor vehicles employing leaf springs attached to the frame of the chassis and serving as a support for the axle assembly have long been known to possess certain advantages and certain disadvantages. Among these disadvantages may be noted the tendency of the springs to wind up under severe braking or acceleration of the vehicle thus resulting in wheel hop or axle tramp. In addition, excessive body roll of the vehicle may occur in various cornering situations. Also, the problem of excessive understeering may be encountered during operation of vehicles equipped with these conventional spring suspensions.

Many proposals to alleviate these disadvantages, while at the same time retaining the relatively simple and inexpensive arrangement for mounting of the live rear axle, have been made by others. The use of a stabilizing bar mounted upon the frame of the chassis forwardly of the axle assembly and attached to that axle assembly has, for example, been proposed in the Bausch U.S. Pat. No. 3,388,762 and the Read U.S. Pat. No. 2,753,007. Also in the older Huntman U.S. Pat. No. 2,107,183 the use of such a stabilizing bar mounted upon the chassis frame and connected to the leaf springs forwardly of the axle assembly has been proposed. In contrast therewith the present invention teaches the use of a stabilizing bar which serves the equivalent purposes taught by this prior art in a less expensive and improved manner and which may be attached to or detached from a conventional vehicle with a relatively small amount of labor.

SUMMARY

The invention embodies the use of a U-shaped stabilizing bar totally supported by the rearward portions of a pair of leaf springs and attached to the springs by clamps having elastomeric bushings through which the parallel leg portions of the bar extend. The central portion of the bar extends transversely of the vehicle adjacent the axle housing thereof. The combination of mounted parts is such that the legs of the bar serve to oppose spring wind-up during braking or acceleration of the vehicle, and the central portion of the bar acts in torsion to oppose roll of the chassis during cornering of the travelling vehicle.

Among the objects of the invention are the provision of an improved stabilizing means for wheeled vehicles comprising a single bar adapted jointly to reduce spring wind up, understeering, and body roll; the provision of a stabilizing bar which may be assembled on a conventional vehicle spring suspension without modification of the vehicular parts; the provision of an inexpensive stabilizing means which may be installed without undue labor or cost; and the provision of a stabilizing means characterized by its simplicity and its ready adaptability to conventional vehicular leaf spring suspensions.

These and other objects and advantages of the invention will become more apparent as the description proceeds and when considered in conjunction with the accompanying drawing, in which FIG. 1 is a diagrammatic view of a typical installation in plan showing the relation of the stabilizing bar to the frame and axle and indicating the ease with which the bar may be installed.

Figure 1:
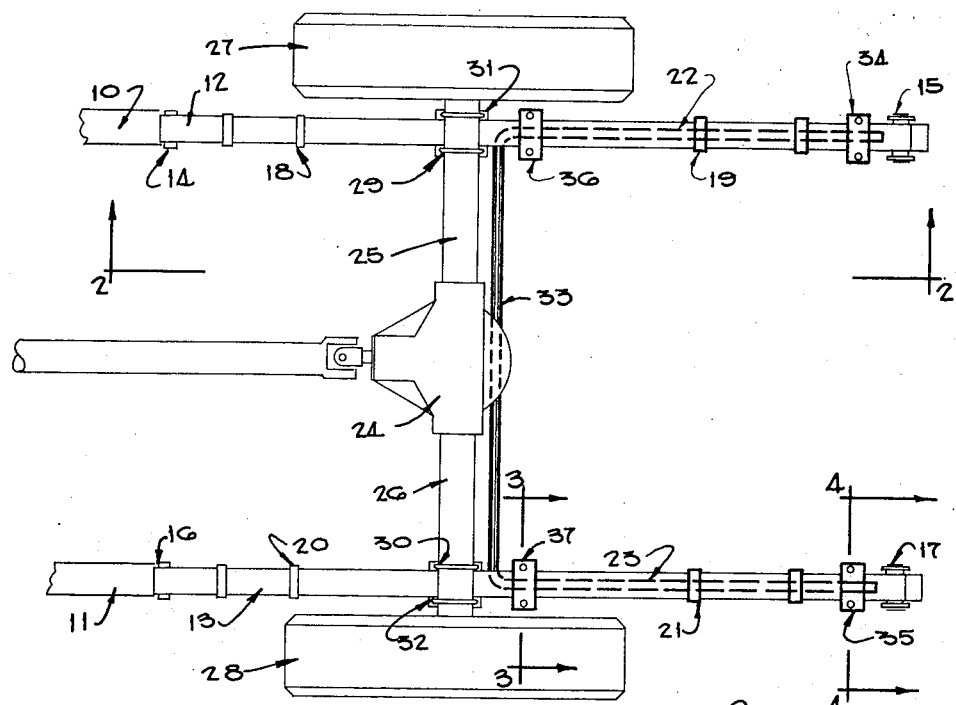
Figure 2:
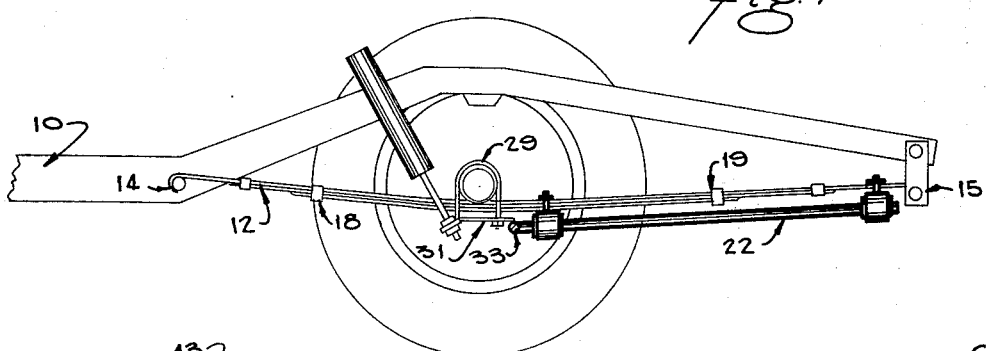
FIG. 2 is a view taken on line 2—2 of FIG. 1.

A typical vehicle with which the present invention may be employed comprises a chassis having right and left hand frame members 10, 11 respectively to which semi-elliptical leaf springs indicated generally at 12, 13 are attached at their ends by means of conventional brackets such as 14, 15 and 16, 17 respectively. The shorter leaf portions of these springs are secured upon the upper longer leaf by means of conventional clips 18, 19 and 20, 21, and the rear clips 19 and 21 are located above the legs 22, 23 of the stabilizing bar, later to be described.

The differential housing 24 of the vehicle is attached in usual manner to the axle housing portions 25, 26 within which the axle having wheels 27, 28 at its outer ends is mounted. By means of the customary U-shaped bolts 29, 30 engaging over the axle housing and secured to plates 31, 32 abutting the lower surface of the respective springs, the live axle assembly is thus secured to the chassis.

As a significant feature of the present invention, there is provided a generally U-shaped stabilizing bar having a central portion 33 extending transversely of the frame and merging into the rearwardly extending leg portions 22 and 23. This bar, for example, may comprise a cold drawn steel rod of circular cross section having a diameter of about 0.750 inch. The respective legs of the bar are securely attached to the undersides of the springs by means of symmetrically spaced first clamps 34, 35 and second clamps 36, 37.

Figure 3:
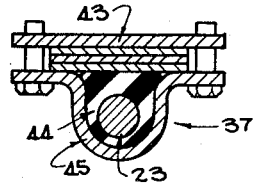
FIG. 3 is a sectional view on line 3—3 of FIG. 1.
Figure 4:
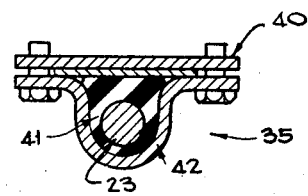
FIG. 4 is a sectional view on line 4—4 of FIG. 1.

As best seen in FIG. 1, the first clamps are located adjacent the brackets which mount the rear ends of the springs and comprise a flat plate 40 having a pair of tapped holes therein and resting on the top surface of the upper long leaf of the spring. The leg 23 of the bar extends through a bushing 41 of elastomeric material held within an arcuate lower clamp plate 42 having apertured ears through which side bolts extend into threaded engagement with the plate 40. Similarly, the second clamps comprise a flat plate 43, as seen in FIG. 3, having tapped holes therein and resting on the top surface of the upper long leaf of the spring. The leg 23 of the bar also extends through a bushing 44 of elastomeric material held within an arcuate lower clamp plate 45 having apertured ears through which side bolts extend into threaded engagement with the plate 43. As will further be noted, the side bolts of these clamps are free of shear or bending loads as the stabilizing bar is performing its functions. Equivalent forms of fastenings may, of course, be employed without departing from the invention.

The length and the location of the respective legs of the bar are such as to afford substantial leverage between the first and second clamps on each leg and the elastomeric bushing therefore should be clamped tightly between the spring leaf and the lower clamp to serve the following purpose.

During assembly the respective bushings are first slipped on the legs of the bar and the fastenings for the clamps are lightly engaged between the upper and lower clamp plates and with the central portion 33 of the bar disposed at its optimum location. Upon increased tightening of these fastenings the bushing material engages tightly against the legs confined thereby and becomes preloaded. When thus compressed, the bushings in combination with the bar then serve to dampen any undesirable deflections of the leaf springs. However, the described arrangement does not substantially alter the spring rate or prevent a shorter leaf of the spring from sliding with respect to its companion leaves embraced by the spring clips.

A further advantage of the structure as thus described resides in the reduction of body roll and understeering of the travelling vehicle. Since the transverse portion 33 of the bar remains essentially parallel to the pavement at all times, that bar portion therefore will be placed in torsion whenever the vehicle chassis is moved into a plane which is not parallel with such pavement, as in a cornering situation. This torque supplied by the portion 33 of the rod, accordingly serves to resist the tendency of the chassis to move into such a non-parallel plane, and thereby not only reduces body roll, but also adds to the safety and comfort of the vehicle operator.

As will now be apparent, the stabilizing means is simple and inexpensive as well as providing for improved safety and comfort in vehicular operation. It may be installed with unskilled labor since no welding or modification of the chassis, the spring elements, or the axle housing is required.

Having thus described a preferred form of stabilizing means, it will be understood that changes and modifications of the same are possible within the scope of the appended claims.

What is claimed is:

1. In combination with the chassis of a vehicle having a frame, a pair of leaf springs spaced transversely of the frame and attached at their ends to said frame, and an axle assembly supported upon said springs; the improvement comprising a stabilizing bar serving jointly as an anti-sway means and as a spring wind up control means, said bar having a central portion extending generally parallel to and adjacent said axle assembly and a pair of rearwardly extending leg portions respectively disposed beneath and in the vertical planes of said springs, the length of each of said leg portions being substantially half the length of the corresponding spring, and means for attaching said bar to said springs in isolated mounting relation to both said axle assembly and said frame and without substantially altering the spring rate.

2. The combination of apparatus defined in Claim 1 wherein said bar-attaching means comprises a pair of bar-embracing clamping members for each of the legs of said bar and secured to the respective springs, one of said members being located adjacent the rearward end of the leg and the other of said members being located adjacent the junction of the leg and the central portion of said bar.

3. The combination of apparatus as defined in Claim 2 wherein each of said clamping members includes a lower portion housing an elastomeric bushing through which the leg of the bar passes, said bushing being in contact with the lower surface of said spring.

4. The combination of apparatus as defined in Claim 3 wherein each of said clamping members includes an upper portion disposed in contact with the upper surface of the spring and tightly secured to said lower portion of the clamping member by fastenings disposed adjacent the sides of said spring.

* * * * *